United States Patent
Wakizaka (10) Patent No.: US 8,098,709 B2
(45) Date of Patent: Jan. 17, 2012

(54) WIRELESS DEVICE CONFIGURED TO EXCLUDE FREQUENCY BANDS BASED ON FIELD INTENSITY MEASUREMENT

(75) Inventor: Masaaki Wakizaka, Ichinomiya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 842 days.

(21) Appl. No.: 12/052,129

(22) Filed: Mar. 20, 2008

(65) Prior Publication Data

US 2008/0240205 A1 Oct. 2, 2008

(30) Foreign Application Priority Data

Mar. 28, 2007 (JP) .................................. 2007-083925

(51) Int. Cl.
*H04B 1/00* (2006.01)

(52) U.S. Cl. ................... 375/132; 370/474; 455/513

(58) Field of Classification Search ............... 370/252, 370/333, 350, 428, 465, 474, 536; 375/132
See application file for complete search history.

(56) References Cited

U.S. PATENT DOCUMENTS

| | | | | |
|---|---|---|---|---|
| 5,995,515 A * | 11/1999 | Suzuki | ........................ | 370/465 |
| 6,131,038 A * | 10/2000 | Sekine | ........................ | 455/513 |
| 6,484,077 B1 * | 11/2002 | Unose et al. | ........................ | 701/24 |
| 7,006,451 B2 | 2/2006 | Kuwahara | | |
| 7,016,395 B2 | 3/2006 | Watanabe et al. | | |
| 2005/0002421 A1 * | 1/2005 | Ito et al. | ........................ | 370/474 |
| 2005/0065779 A1 * | 3/2005 | Odinak | ........................ | 704/201 |
| 2010/0214928 A1 * | 8/2010 | Nogami et al. | ........................ | 370/241 |

FOREIGN PATENT DOCUMENTS

| | | |
|---|---|---|
| JP | 2001-086565 A | 3/2001 |
| JP | 2002198867 A | 7/2002 |
| JP | 2002198868 A | 7/2002 |
| JP | 2004-254204 A | 9/2004 |
| JP | 2005-167910 A | 6/2005 |
| JP | 2005-303583 A | 10/2005 |
| JP | 2006-229654 A | 8/2006 |

OTHER PUBLICATIONS

Japan Patent Office, Notification of Reason for Refusal for Japanese Patent Application No. 2007-083925 (counterpart to above-captioned patent application), dispatched Feb. 22, 2011.

* cited by examiner

*Primary Examiner* — David C. Payne
*Assistant Examiner* — Leon-Viet Nguyen
(74) *Attorney, Agent, or Firm* — Baker Botts L.L.P.

(57) ABSTRACT

A wireless device including a first radio communication portion configured to effect radio communication with a first external communication device while using frequency bands selected one after another from among a group of frequency bands, a field intensity measuring portion which is configured to measure a field intensity value for each of a plurality of frequency bands belonging to at least the group of frequency bands and which is provided in a portion different from the first radio communication portion, and an excluding portion configured to exclude each of the above-indicated plurality of frequency bands for which the measured field intensity value is higher than a predetermined threshold value, from the above-indicated group of frequency bands.

7 Claims, 9 Drawing Sheets

PRIOR ART

WIRELESS DEVICE CONFIGURED TO EXCLUDE FREQUENCY BANDS BASED ON FIELD INTENSITY MEASUREMENT

CROSS REFERENCE TO RELATED APPLICATION

The present application claims the priority from Japanese Patent Application No. 2007-083925 filed Mar. 28, 2007, the disclosure of which is herein incorporated by reference in its entirety.

BACKGROUND OF THE INVENTION

1. Field of the Invention

The present invention relates to a wireless device including a plurality of wireless or radio communication portions using the same frequency band.

2. Description of Related Art

Recent prior art networks that connect wireless devices are designed according to standards of IEEE 802.11 and Bluethooth (registered trademark).

The wireless devices such as a cordless telephone set operate in the same frequency band of 2.4 GHz referred to as an ISM (Industry Science Medical) band, so that wave interferences may take place where the same frequency band is concurrently used by the wireless devices located in a narrow area, giving rise to unsatisfactory communication results.

According to prior art solutions for minimizing the wave interferences caused by the use of the same frequency band by a plurality of wireless devices in a narrow area, a bit error rate or an electric field intensity is measured for each of frequency channels prior to communication, so that the use of frequency channels that involve considerable wave interferences is inhibited to minimize the wave interferences. Examples of such prior art solutions are disclosed in JP-2002-198867A and JP-2002-198868A.

Where a plurality of time slots for measuring the electric field intensity are provided for the respective frequency channels, according to the above-indicated prior art solutions, however, signal transmission may be delayed, resulting in sound interruption or delayed sound transmission or reception in wireless or radio communication by a digital cordless telephone set, for example, which requires real-time communication. Accordingly, the prior art solutions are not satisfactory for reliable and stable communication by the digital cordless telephone set.

SUMMARY OF THE INVENTION

The present invention was made in view of the background art described above. It is therefore an object of the present invention to provide a wireless device which includes a radio communication portion for radio communication with an external radio communication device, and which is configured to minimize interruption and delay of radio communication with the external radio communication device.

The object indicated above can be achieved according to the principle of this invention, which provides a wireless device comprising (a) a first radio communication portion configured to effect radio communication with a first external communication device while using frequency bands selected one after another from among a group of frequency bands, (b) a field intensity measuring portion configured to measure a field intensity value for each of a plurality of frequency bands belonging to at least the above-indicated group of frequency bands, the field intensity measuring portion being provided in a portion different from the first radio communication portion, and (c) an excluding portion configured to exclude each of the above-indicated plurality of frequency bands for which the measured field intensity value is higher than a predetermined threshold value, from the above-indicated group of frequency bands.

In the wireless device constructed according to the present invention described above, the first radio communication portion effects radio or wireless communication with the first external communication device, by using the frequency bands excluding at least one frequency band for which the field intensity value measured by the field intensity measuring portion located outside the first radio communication portion is higher than the predetermined threshold value. Accordingly, the first radio communication portion is capable of effecting continuous data transmission to the first external communication device, with a minimum delay of the data transmission, and assures reliable and stable radio communication with the first external communication device without an interference with other radio communications.

In a first preferred form of the present invention, the wireless device further comprises a second radio communication portion configured to effect radio communication with a second external communication device different from the first external communication device, and wherein the field intensity measuring portion is provided in the second radio communication portion.

In the first preferred form of the invention wherein the field intensity measuring portion is provided in the second radio communication portion communicable with the second external communication device other than the first external communication device, the first radio communication portion is capable of effecting continuous data transmission, with a minimum delay of the data transmission, and assures reliable and stable radio communication with the first external communication device without wave interferences, by utilizing the function of the second radio communication portion for radio communication with the second external communication device.

In a second preferred form of the invention, the wireless device further comprises a threshold increasing portion configured to increase the predetermined threshold value when the number of the frequency bands available for radio communication with the first external communication device is smaller than a predetermined lower limit as a result of exclusion of at least one frequency band by the excluding portion from the above-indicated group of frequency bands.

In the second preferred form of the invention described above, above, the threshold value is increased if the number of the frequency bands available is smaller than the predetermined lower limit due to a bad condition of wave reception, so that the frequency bands for which the measured field intensity values are comparatively low are selected from among the frequency bands for which the measured field intensity values are relatively high, whereby reliable and stable radio transmission and reception are available between the first radio communication portion and the first external communication device.

In one advantageous arrangement of the first preferred form of this invention, the first external communication device is a cordless handset of a digital cordless telephone set, and the first radio communication portion is a base unit of the digital cordless telephone set.

In the above-described advantageous arrangement wherein the first external communication device is a cordless handset of the digital cordless telephone set while the first radio communication portion is a base unit of the digital cordless telephone set, the field intensity measuring portion and excluding portion described above cooperate with each other to reliable and stable communication between the parent and child units of the digital cordless telephone set, with minimum sound interruption and minimum delayed sound transmission and reception, without wave interferences.

BRIEF DESCRIPTION OF THE DRAWINGS

The above and other objects, features, advantages and technical and industrial significance of the present invention will be better understood by reading the following detailed description of preferred embodiments of the present invention, when considered in connection with the accompanying drawings, in which.

DETAILED DESCRIPTION OF THE PREFERRED EMBODIMENTS

Figure 1:
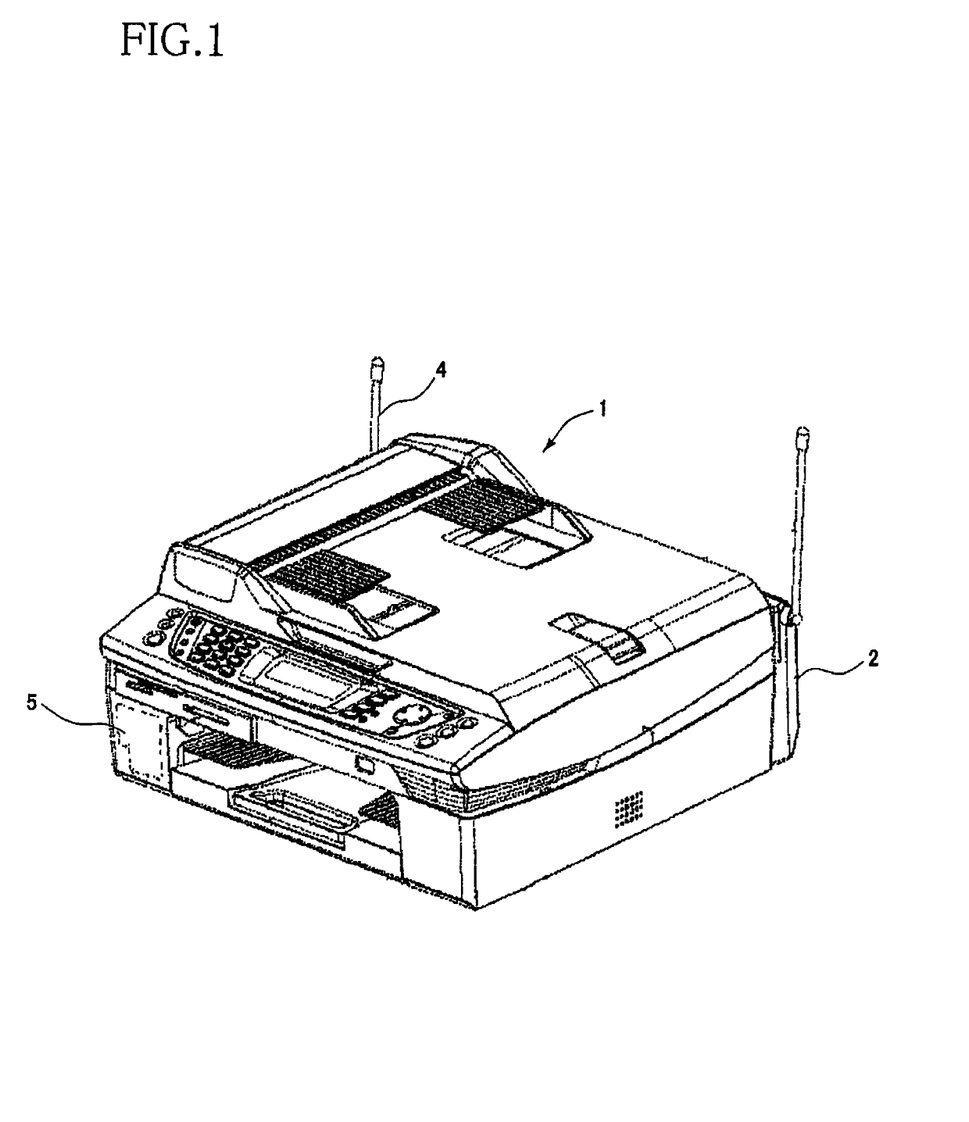
FIG. 1 is an external perspective view of a wireless device constructed according to one embodiment of the present invention.

Referring to the drawings, the preferred embodiments of this invention will be described in detail. As shown in the external perspective view of FIG. 1, a wireless device 1 which is constructed according to one embodiment of the invention functions as a base unit of a digital cordless telephone set and a member of a wireless LAN (wireless local area network: WLAN). The wireless device 1 includes a digital cordless antenna portion 4 for wireless or radio transmission and reception of data to and from a cordless handset 2 of the digital cordless telephone set, and a wireless LAN antenna portion 5 for wireless or radio transmission and reception of data to and from a personal computer (PC) 12 which is another member of the wireless LAN as shown in FIG. 2.

Figure 2:
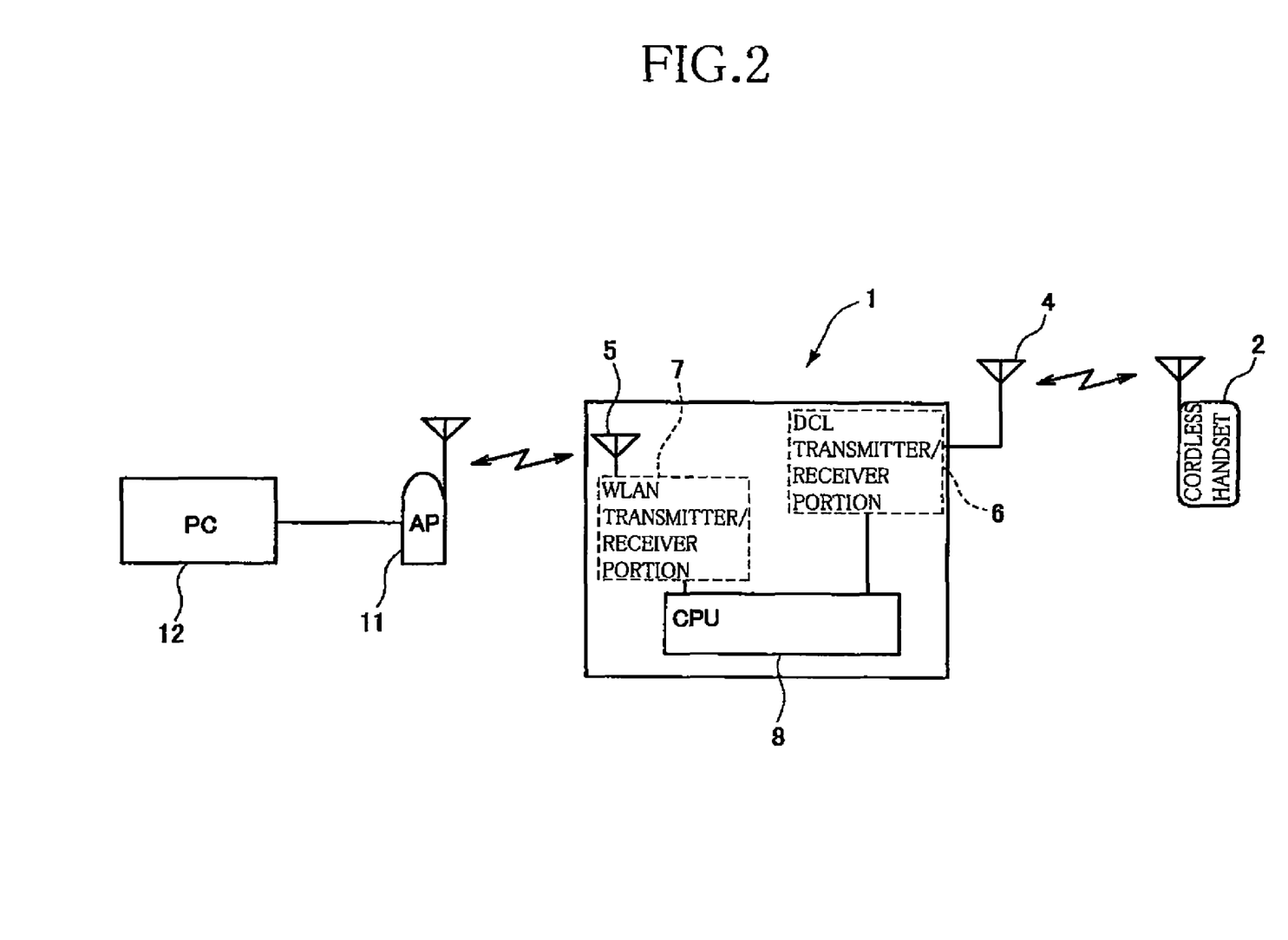
FIG. 2 is a block diagram showing major elements of a wireless network including the wireless device of FIG. 1.

As shown in the block diagram of FIG. 2, the wireless device 1 includes, in addition to the above-described digital cordless antenna portion 4 and wireless LAN antenna portion 5, a digital cordless (DCL) transmitter/receiver portion 6 for radio communication with the cordless handset 2, a wireless LAN (WLAN) transmitter/receiver portion 7 for radio communication with the PC 12, and a central processing unit (CPU) 8 for controlling various portions of the wireless device 1. The DCL transmitter/receiver portion 6 is operated to effect radio communication with the cordless handset 2, according to control commands received from the CPU 8. The wireless network shown in FIG. 2 further includes an external wireless device in the form of an access point (AP) 11 connected to the PC 12. The WLAN transmitter/receiver portion 7 is operated to effect radio communication with the PC 12 through the AP 11, according to control commands received from the CPU 8.

It will be understood that the cordless handset 2 corresponds to a first external wireless device, while the PC 12 connected to the AP 11 corresponds to a second external wireless device, and that the DCL transmitter/receiver portion 6 corresponds to a first radio communication device, while the WLAN transmitter/receiver portion 7 corresponds to a second radio communication device.

The DCL transmitter/receiver portion 6 uses frequency hopping for radio communication with the cordless handset 2. The frequency hopping is implemented according to a hopping table such that the frequency is changed for each time slot.

Figure 3:
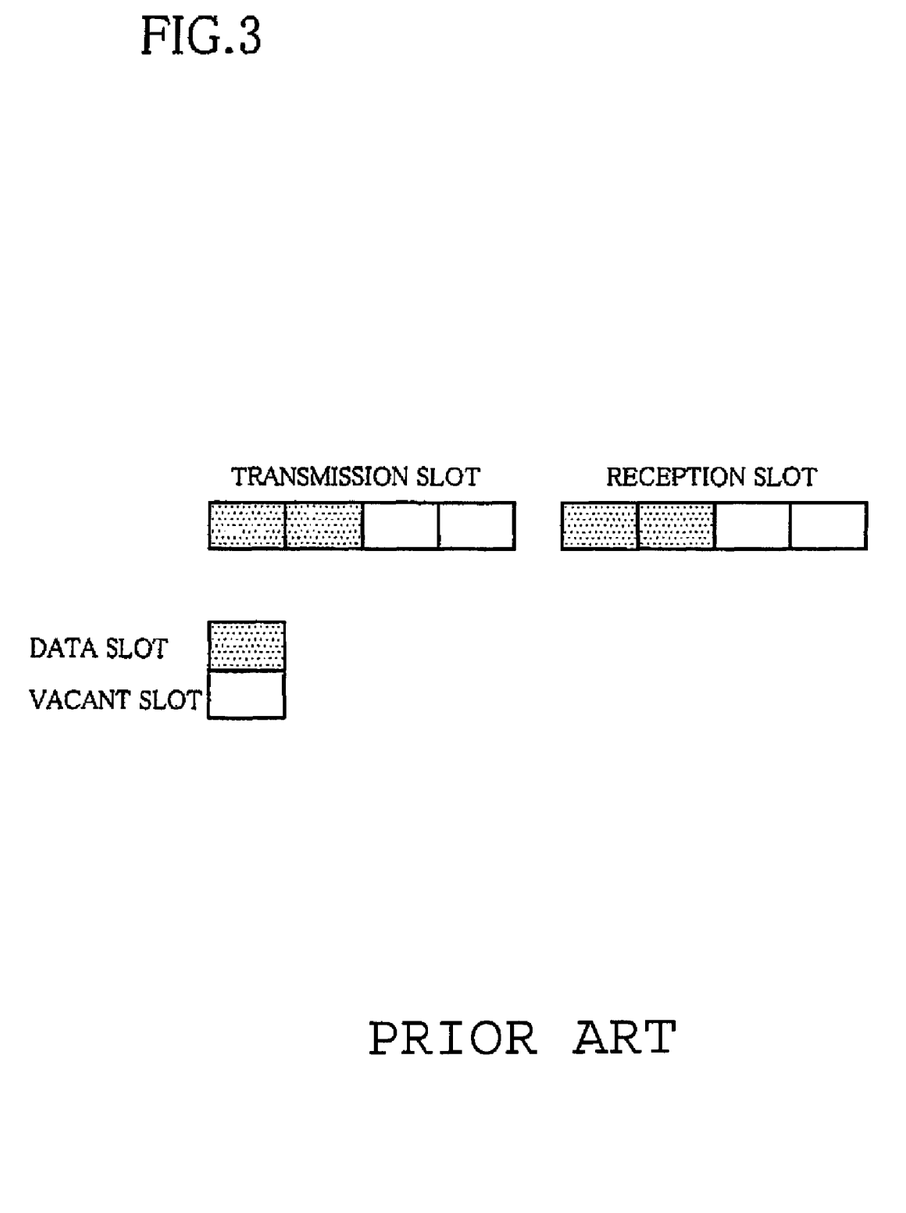
FIG. 3 is a view indicating time slots according to a prior art communication method.

Referring to FIG. 3, there is indicated time slots according to a prior art communication method in which two successive data slots corresponding to two periods are provided for data communication (transmission or reception), and two successive vacant slots corresponding to the following two periods follow the two data slots, No data communication is effected for the vacant slots. The two data slots and the two vacant slots are alternately repeated for data transmission or reception. The prior art communication method utilizes a length of time corresponding to the vacant slots, for measuring an ambient electric field intensity to determine at least one frequency band to be changed. As indicated in FIG. 3, the data slots and vacant slots for data transmission and the data slots and vacant slots for data reception are identical with each other.

Figure 4:
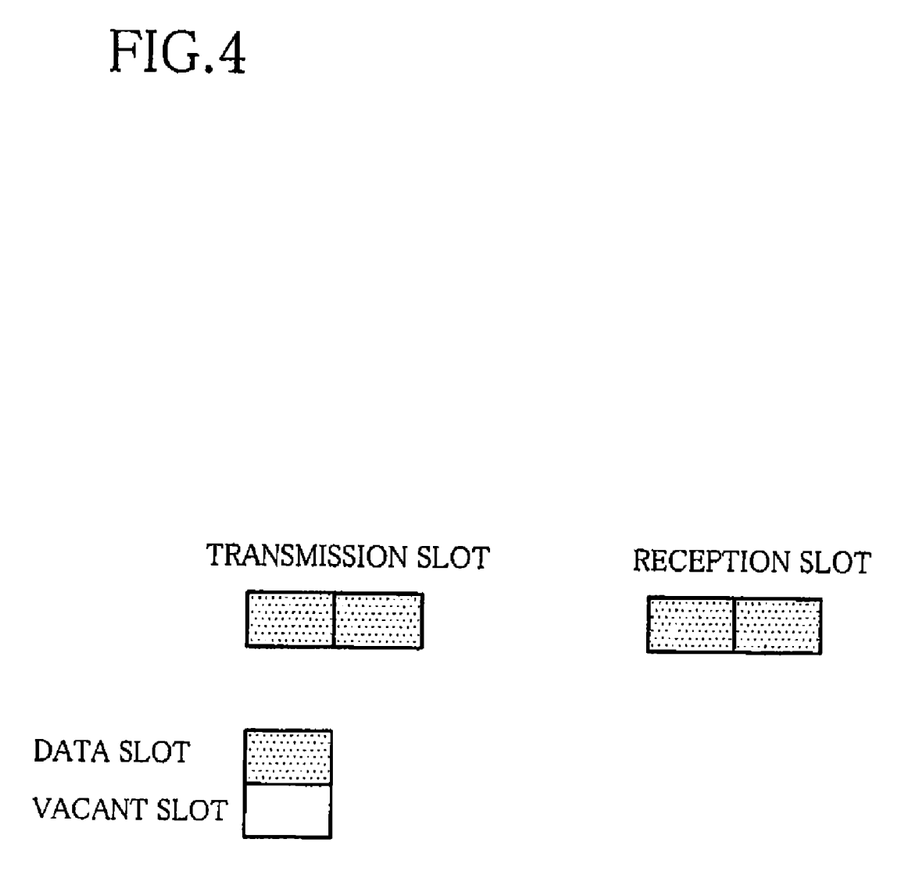
FIG. 4 is a view indicating time slots for communication of the wireless device of FIG. 1 with an external radio communication device in the form of a digital cordless telephone set.

On the other hand, time slots used by the DCL transmitter/receiver portion 6 according to the present embodiment of the invention do not include vacant slots, and consist solely of data slots, as indicated in FIG. 4. The absence of the vacant slots eliminates a delay in the data transmission and reception, preventing sound interruption and delayed sound transmission or reception in the radio communication with the cordless handset 2.

Referring next to the flow charts of FIGS. 5 and 6, there will be described processing operations of the DCL transmitter/receiver portion 6 and the WLAN transmitter/receiver portion 7, which include measurement of ambient electric field intensity.

Figure 5:
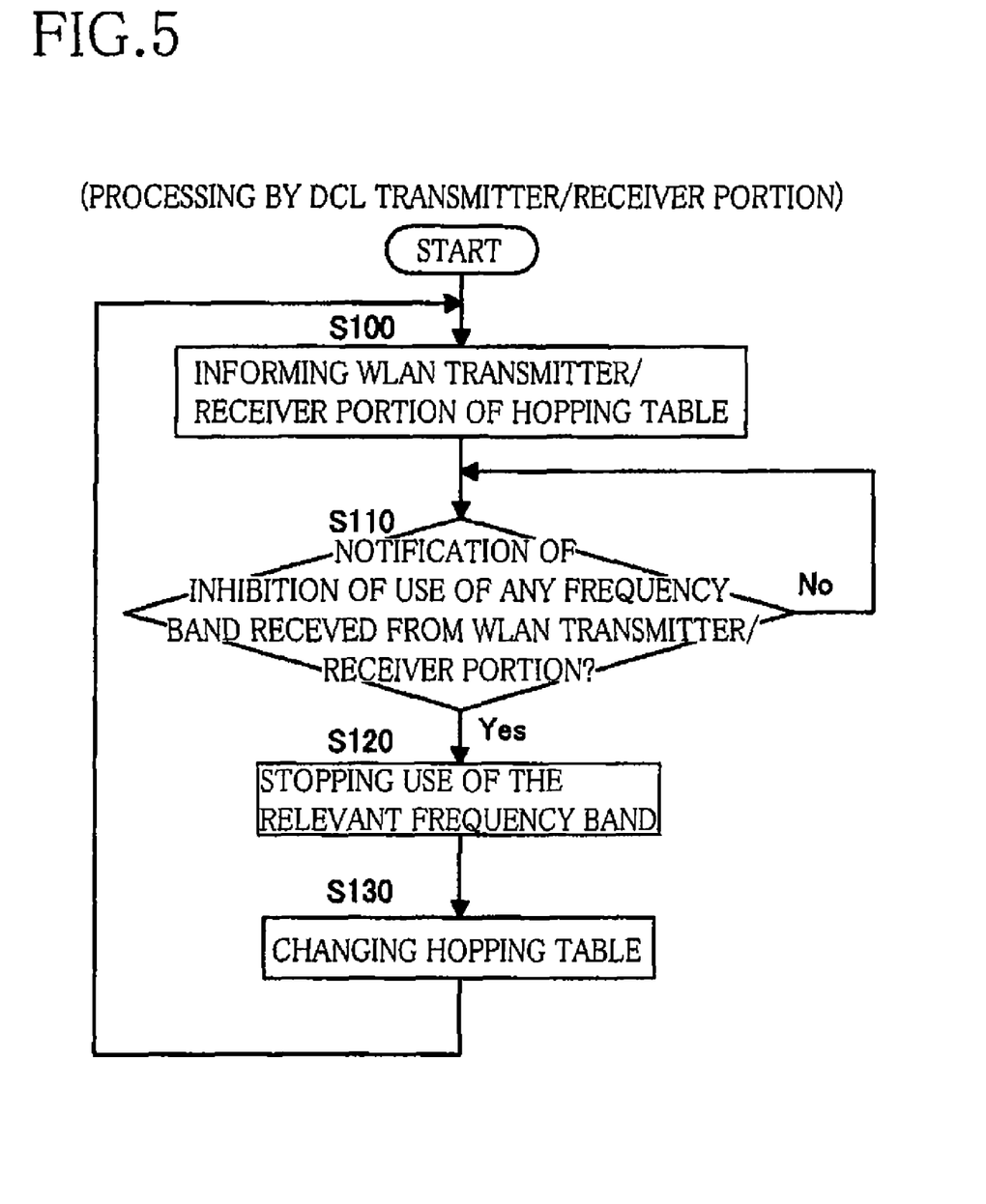
FIG. 5 is a flow chart illustrating a control routine executed by a DCL transmitter/receiver portion of the wireless device of FIG. 1 where a hopping table is used commonly by the DCL transmitter/receiver portion and a WLAN transmitter/receiver portion.

Reference is first made to the flow chart of FIG. 5, which illustrates the control routine executed by the DCL transmitter/receiver portion 6 where the hopping table is used commonly by the DCL transmitter/receiver portion 6 and the WLAN transmitter/receiver portion 7. As described below in detail, this processing operation is performed by the DCL transmitter/receiver portion 6 to determine and change the frequency bands for radio communication with the digital cordless telephone 2, on the basis of a notification received from the WLAN transmitter/receiver portion 7. The control routine of FIG. 5 is initiated with step S100 in which the DCL transmitter/receiver portion 6 informs the WLAN transmitter/receiver portion 7 of the hopping table through the CPU 8.

Figure 6:
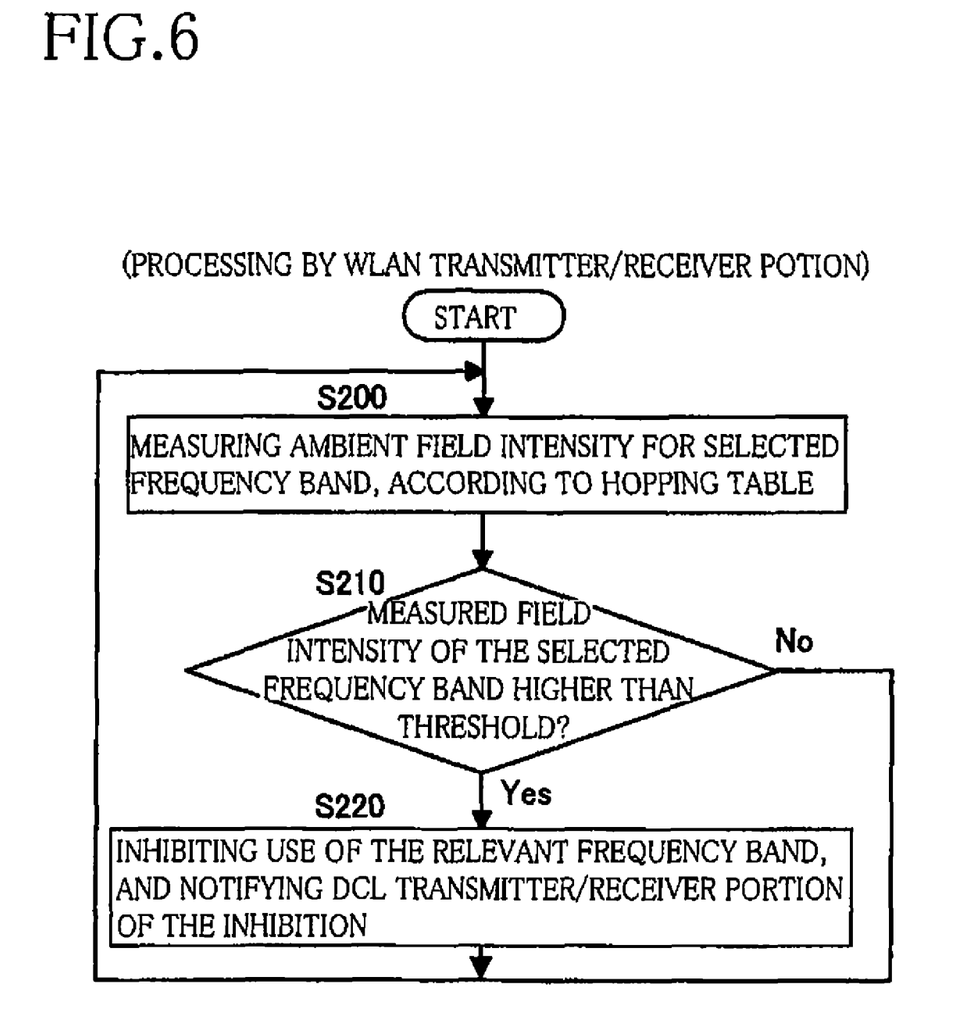
FIG. 6 is a flow chart illustrating a control routine executed by the WLAN transmitter/receiver portion where the hopping table is used commonly.

The WLAN transmitter/receiver portion 7 which has received the hopping table measures the field intensity for each of the plurality of frequency bands included or specified in the hopping table (step S200 of the control routine of FIG. 6). The hopping table is used commonly by the DCL transmitter/receiver portion 6 and the WLAN transmitter/receiver portion 7, that is, the WLAN transmitter/receiver portion 7 knows the frequency bands included in the hopping table, so that the WLAN transmitter/receiver portion 7 can select the frequency bands one after another, and successively measure the ambient field intensity values for the successively selected frequency bands. Thus, the WLAN transmitter/receiver portion 7 can grasp updated conditions of all of the frequency bands included in the hopping table. If the measured intensity value of the selected frequency band is higher than a predetermined threshold value (if an affirmative determination is obtained in step SA210 of FIG. 6), the WLAN transmitter/receiver portion 7 inhibits the use of this frequency band, and notifying the DCL transmitter/receiver portion 6 of the inhibition of use of the frequency band in question, through the CPU 8 (step S220 of FIG. 6).

In the control routine of FIG. 5, the above-described step S100 is followed by step S110 to determine whether the DCL transmitter/receiver portion 6 has received the notification of the inhibition of use of any frequency band used for the radio communication (any frequency channel included in the hopping table), from the WLAN transmitter/receiver portion 7. This step S110 is repeatedly implemented until an affirmative determination (YES) is obtained in the step S110. Thus, the step S110 provides a waiting time until the notification of the inhibition of use of any frequency band or channel has been received by the DCL transmitter/receiver portion 6. The determination in step S110 is made for all of the frequency channels included in the hopping table, to check if the notification of the inhibition of use of any frequency channel has been received from the WLAN transmitter/receiver portion 7. However, the number of the frequency bands or channels for which the field intensity value is measured by the WLAN transmitter/receiver portion 7 is limited. Namely, only the frequency channels included in the hopping table are subject to the determination as to whether the use of each of those frequency channels should be inhibited, so that determination can be completed in a shorter time, and the frequency table can be more efficiently updated (in step S130 described below), than in the case where the determination is made for all frequency channels which can be used for radio communication and which include the frequency channels included in the hopping table.

If the DCL transmitter/receiver portion 6 has received the notification of the inhibition of use of any frequency band or channel from the WLAN transmitter/receiver portion 7, that is, if the affirmative determination (YES) is obtained in step S110, the control flow goes to step S120 in which the DCL transmitter/receiver portion 6 stops using the frequency band (channel) in question, and then goes to step S130 in which the DCL transmitter/receiver portion 6 replaces the frequency band in question with another frequency band, for thereby changing or updating the hopping table, whereby the hopping channels are changed.

Then, the control flow goes back to step S100 in which the DCL transmitter/receiver portion 6 informs the WLAN transmitter/receiver portion 7 of the updated or new hopping table, and waits for the notification of the inhibition of use of any frequency band or channel. Thus, the repeated execution of the control routine of FIG. 5 permits determination and change of the frequency bands used for radio communication with the cordless handset 2.

The chart of FIG. 6 illustrates the control routine executed by the WLAN transmitter/receiver portion where the hopping table is used commonly by the DCL transmitter/receiver portion 6 and the WLAN transmitter/receiver portion 7. According to this control routine, the ambient field intensity values are measured by the WLAN transmitter/receiver portion 7, for all frequency channels included in the table, and the DCL transmitter/receiver portion 6 is notified of the inhibition of use of each frequency band for which the measured field intensity value is higher than the threshold value. The measurement of the field intensity values is implemented by the WLAN transmitter/receiver portion 7 in response to the reception of the hopping table from the CPU 8, and according to the received hopping table. That is, step S200 of FIG. 6 is implemented upon reception of the hopping table from the CPU 8, to measure the field intensity value for the frequency band which is initially selected from the received hopping table.

Then, the control flow goes to step S210 to determine whether the measured field intensity value is higher than the predetermined threshold value. If an affirmative determination (YES) is obtained in step S210, the control flow goes to step S220 in which the use of the frequency band in question is inhibited, and the WLAN transmitter/receiver portion 7 notifies the DCL transmitter/receiver portion 6 of the inhibition of use of this frequency band, through the CPU 8. If a negative determination (NO) is obtained in step S210, the control flow goes back to step S200, that is, one cycle of execution of the present control routine is terminated. In the next cycle of execution of the control routine, the field intensity values are measured for the frequency bands specified or included in the hopping table received next from the CPU 8.

According to the control routine of FIG. 6, the WLAN transmitter/receiver portion 7 measures the ambient field intensity values for the individual frequency bands or channels specified in the hopping table received from the DCL transmitter/receiver portion 6, and notifies the DCL transmitter/receiver portion 6 of each frequency band for which the measured field intensity value is higher than the threshold value. Since the WLAN transmitter/receiver portion 7 is provided for radio communication with the PC 12, for printing operations, in particular, the load of the WLAN transmitter/receiver portion 7 is lower than that of the DCL transmitter/receiver portion 6 for radio communication with the cordless handset 2. In this respect, the WLAN transmitter/receiver portion 7 is able to operate to execute the control routine of FIG. 6.

It will be understood from the foregoing description of the present embodiment that a portion of the WLAN transmitter/receiver portion 7 assigned to implement step S200 of FIG. 6 constitutes a field intensity measuring portion, and a portion of the DCL transmitter/receiver portion 6 assigned to implement step S120 of FIG. 5 constitutes an excluding portion, while a portion of the DCL transmitter/receiver portion 6 assigned to implement step S130 of FIG. 5 constitutes a hopping table preparing portion for preparing the hopping table. It will also be understood that a portion of the DCL transmitter/receiver portion 6 assigned to control the radio communication according to the prepared hopping table cooperates with the hopping table preparing portion to constitute a hopping control portion, while a portion of the DCL transmitter/receiver portion 6 assigned to implement step S100 of FIG. 5 constitutes a hopping table supplying portion. It will further be understood that a portion of the WLAN transmitter/receiver portion 7 assigned to implement step S200 of FIG. 6 constitutes a selective field intensity measuring portion configured to measure the field intensity values for the frequency bands included in the hopping table supplied from the hopping table supplying portion, and not to measure the field intensity values for the other frequency bands not included in the hopping table.

In the present embodiment, the first radio communication portion in the form of the DCL transmitter/receiver portion 6 can continuously transmit data, by utilizing the function of the second radio communication portion in the form of the WLAN transmitter/receiver portion 7 which effects radio communication with the second external communication device in the form of the PC 12 connected to the AP 11. Accordingly, the present embodiment makes it possible to minimize delayed radio communication and assures reliable and stable radio communication while preventing wave interferences. In particular, the present embodiment minimizes sound interruption or delayed sound transmission or reception of the first external communication device in the form of the cordless handset 2 during wireless communication with the first radio communication portion, while preventing the wave interferences.

Referring next to the flow chart of FIG. 7, there will be described a control routine executed by the DCL transmitter/receiver portion 6 of a wireless device constructed according to another embodiment of this invention wherein the hopping table is not used commonly by the DCL transmitter/receiver portion 6 and the WLAN transmitter/receiver portion 7. In this embodiment wherein the hopping table is not used commonly by the two transmitter/receiver portions 6, 7, the field intensity values for the frequency bands (channels) that can be used for radio or wireless communication according to the frequency hopping method are successively measured, beginning with the field intensity value for the lowest or highest frequency band. In this case, therefore, the number of the frequency bands for which the measurement is made is larger than in the case where the hopping table is used commonly by the DCL transmitter/receiver portion 6 and the WLAN transmitter/receiver 7, but the WLAN transmitter/receiver portion 7 need not wait for the reception of the hopping table from the DCL transmitter/receiver portion 6.

Figure 7:
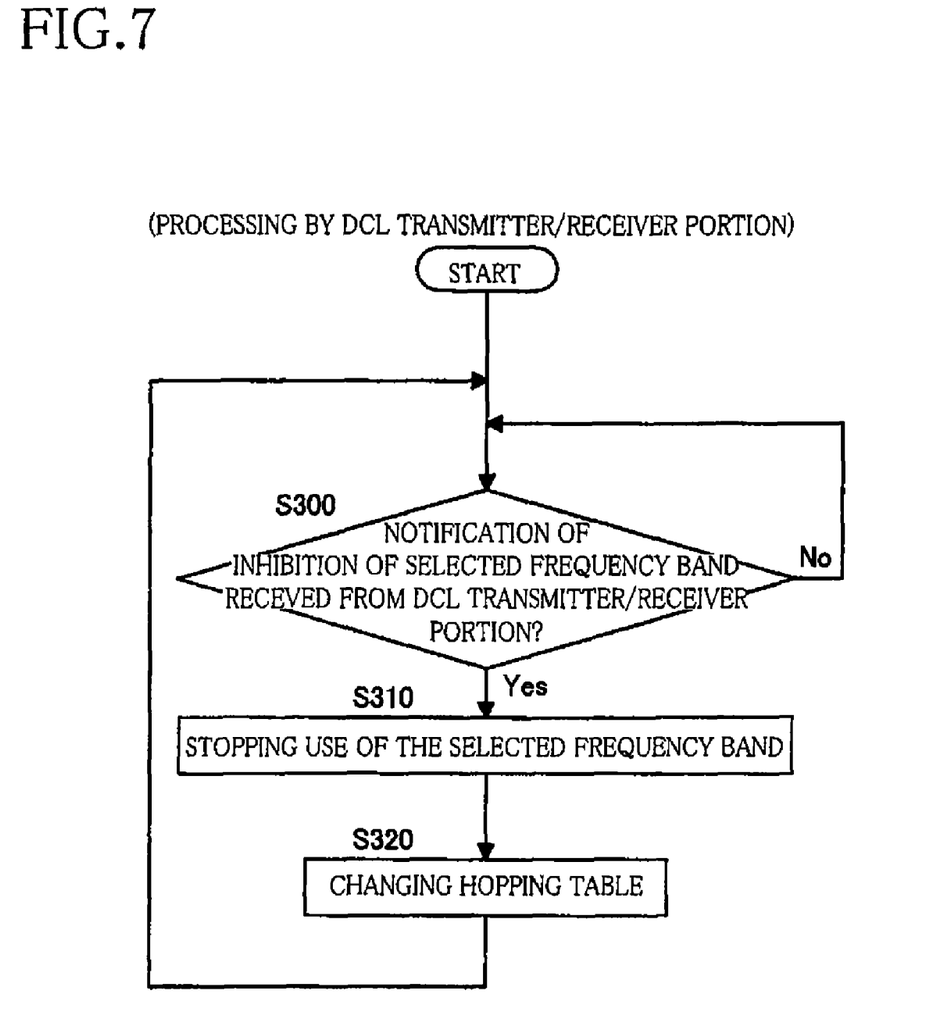
FIG. 7 is a flow chart illustrating a control routine executed by the DCL transmitter/receiver portion of a wireless device constructed according to another embodiment of this invention wherein the hopping table is not used commonly by the DCL transmitter/receiver portion and the WLAN transmitter/receiver portion.

The control routine of FIG. 7 is initiated with step S300 in which the DCL transmitter/receiver portion 6 determines whether the notification of the inhibition of use of any frequency band (that can be used for radio communication according to the frequency hopping method) has been received from the WLAN transmitter/receiver portion 7. If an affirmative determination (YES) is obtained in step S300, the control flow goes to step S310 in which the DCL transmitter/receiver portion 6 stops using the frequency band in question, and then to step S320 to update the hopping table, namely, to prepare the hopping table in which the frequency band in question is replaced by another frequency band.

The control flow goes back to step S300 to determine whether the notification of the inhibition of use of any frequency band included in the updated or newly prepared hopping table has been received from the WLAN transmitter/receiver portion 7. Steps 310 and 320 are implemented if the affirmative determination is obtained in step S300. Thus, the control routine of FIG. 7 is executed each time the hopping table is updated.

The DCL transmitter/receiver portion 6 waits for the notification of the inhibition of use of any frequency band. That is, step S300 is repeatedly implemented until the notification of the inhibition of use of any frequency band is received from the WLAN transmitter/receiver portion 7. By executing the control routine of FIG. 7 as described above, the DCL transmitter/receiver portion 6 determines and updates the frequency bands used for radio communication with the cordless handset 2.

Figure 8:
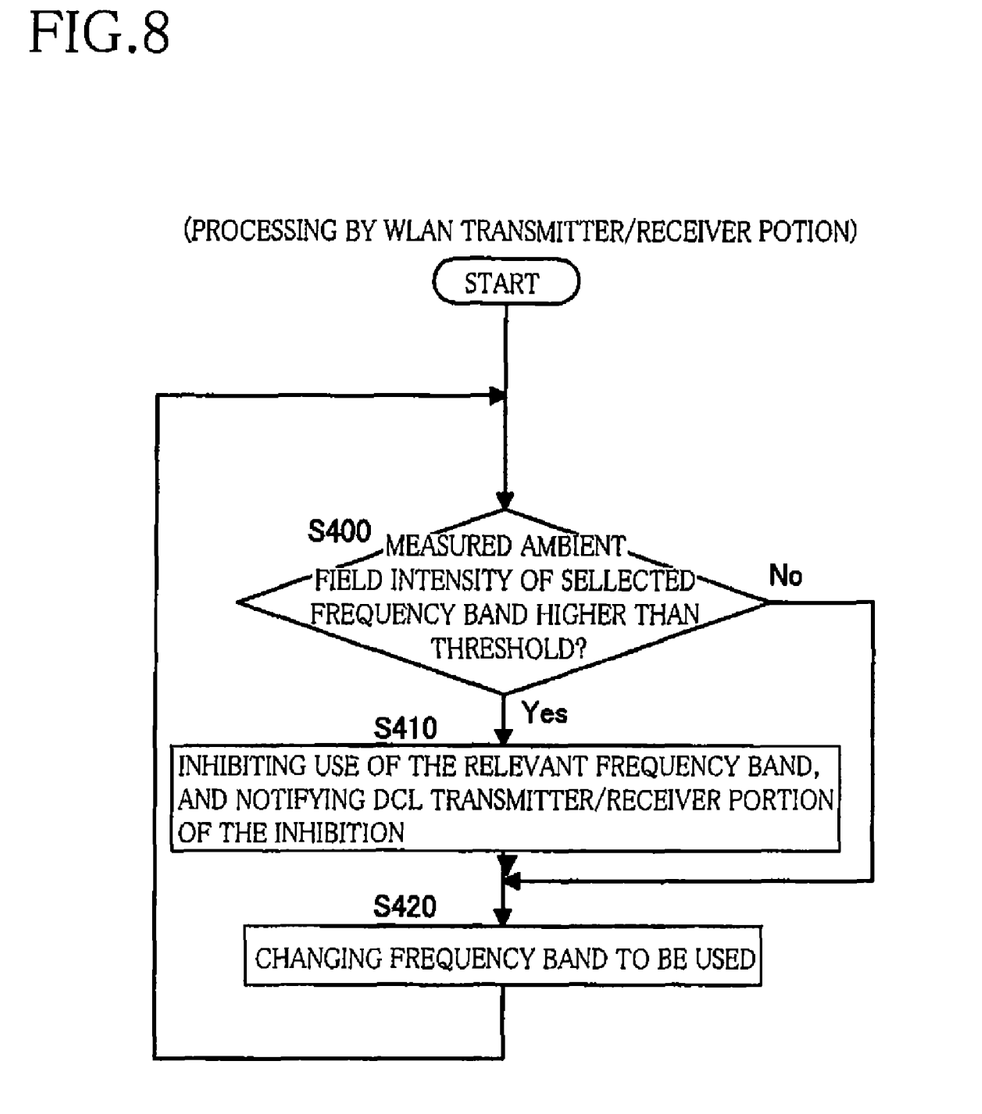
FIG. 8 is a flow chart illustrating a control routine executed by the WLAN transmitter/receiver portion where the hopping table is not used commonly.

The flow chart of FIG. 8 illustrates a control routine executed by the WLAN transmitter/receiver portion 7 where the hopping table is not used commonly by the two transmitter/receiver portions 6, 7.

The control routine of FIG. 8 is initiated with step S400 to determine whether the field intensity value for the presently selected frequency band (channel) is higher than the predetermined threshold value. If an affirmative determination (YES) is obtained in step S400, the control flow goes to step S410 to inhibit the use of the frequency band in question, and notifies the DCL transmitter/receiver portion 6 of the inhibition of use of the frequency band in question, through the CPU 8.

Then, the control flow goes to step S420 in which the WLAN transmitter/receiver portion 7 changes the frequency band for which the measurement of the field intensity value is made, that is, replaces the frequency band the use of which is inhibited, with another frequency band. The control flow then goes back to step S400 to measure the field intensity for the changed frequency band (new frequency band selected in step S420). Since the WLAN transmitter/receiver portion 7 does not use the hopping table commonly with the DCL transmitter/receiver portion 6, the field intensity values are measured successively for all of the frequency bands available for radio communication according to the frequency hopping method.

If a negative determination (NO) is obtained in step S400, the control flow goes to step S420 to change the frequency band for which the measurement is made by the WLAN transmitter/receiver portion 7. The control flow then goes back to step S400 to measure the field intensity value for the next frequency band (selected in step S420). With the control routine of FIG. 8 being repeatedly executed, the field intensity values for the frequency bands are measured by the WLAN transmitter/receiver portion 7, and the DCL transmitter/receiver portion 6 is notified of the inhibition of use of the frequency band or bands for which the measured intensity value or values is/are higher than the threshold value.

It will be understood from the foregoing description of the present second embodiment that a portion of the WLAN transmitter/receiver portion 7 assigned to implement step S400 of FIG. 7 constitutes the field intensity measuring portion, while a portion of the DCL transmitter/receiver portion 6 assigned to implement step S310 constitutes the excluding portion. It will also be understood that a portion of the DCL transmitter/receiver portion 6 assigned to implement step S320 of FIG. 7 constitutes the hopping table preparing portion configured to prepare the hopping table, while a portion of the DCL transmitter/receiver portion 6 assigned to control the radio communication with the cordless handset 2 cooperates with the hopping table preparing portion to constitute the hopping control portion.

Figure 9:
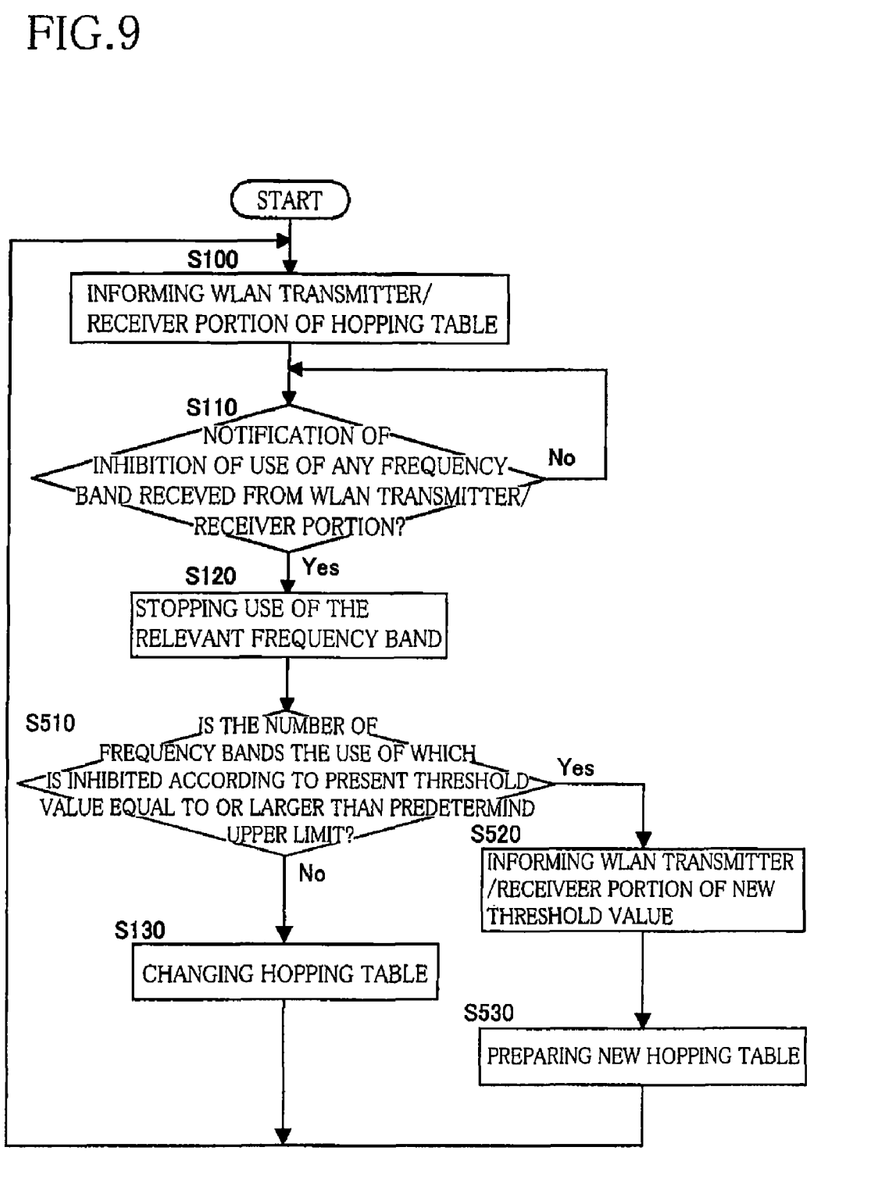
FIG. 9 is a flow chart illustrating a control routine executed by the DCL transmitter/receiver portion of a wireless device constructed according to a further embodiment of this invention.

The flow chart of FIG. 9 illustrates a control routine executed by the DCL transmitter/receiver portion of a wireless device constructed according to a further embodiment of this invention. For radio transmission and reception to and from the cordless handset 2, the number of frequency bands available must be larger than a predetermined lower limit. Therefore, it is desirable to increase the threshold value used in step S400, if the number of the frequency bands for which the measured field intensity values are not higher than the predetermined threshold value is smaller than the predetermined lower limit, due to a bad condition of wave reception. An increase of the threshold value enables the DCL transmitter/receiver portion 6 to use a sufficient number of the frequency bands larger than the lower limit. Where the threshold value is increased (incremented), the measurement of the field intensity values by the WLAN transmitter/receiver portion 7 may be made again using the increased threshold value. Alternatively, the already measured field intensity values are compared with the increased threshold value to determine whether the measured field intensity values are higher than the increased threshold value.

In the flow chart of FIG. 9, steps S100, S110, S120 and S130 are identical with those of the flow chart of FIG. 5, and will not be described redundantly. Step S120 in which the use of the frequency band in question is stopped is followed by step S510 to determine whether the number of the frequency bands the use of which is inhibited according to the present threshold value is equal to or larger than a predetermined upper limit. If an affirmative determination (YES) is obtained in step S510, the control flow goes to step S520 to increment the present threshold value for setting a new threshold value, and to notify the WLAN transmitter/receiver portion 7 of the new threshold value (incremented threshold value). Then, the control flow goes to step S530.

The WLAN transmitter/receiver portion 7 which has received the new threshold value executes the same control routine as illustrated in the flow chart of FIG. 6, to successively measured field intensity values for all of the frequency bands included in the hopping table prior to the reception of the new threshold value, to determine whether the measured field intensity values are higher than the new threshold value, and to notify the DCL transmitter/receiver portion 6 of the frequency band or bands for which the measured field intensity value or values is/are higher than the new threshold value.

The control flow then goes to step S530 in which the DCL transmitter/receiver portion 6 which has been notified of the frequency bands the use of which is inhibited prepares a new hopping table which specifies the frequency bands other than the frequency bands the use of which is inhibited. After step S130 or S530 is implemented, the control flow goes back to step S100, and repeat steps S100, S110, S120 and S130 as described above by reference to the flow chart of FIG. 5. As a result, a sufficient number of frequency bands larger than the predetermined lower limit are available for radio transmission and reception to and from the cordless handset 2. It will be understood that a portion of the DCL transmission/receiver portion 6 assigned to implement steps S510, S520) for increasing or incrementing the threshold value constitutes a threshold increasing portion.

The third embodiment described above is arranged to increase or increment the threshold value if the number of the frequency bands available is smaller than the predetermined lower limit due to a bad condition of wave reception, so that the frequency bands (channels) for which the measured field intensity values are comparatively low are selected from among the frequency bands for which the measured field intensity values are relatively high, whereby reliable and stable radio transmission and reception are available between the DCL transmitter/receiver portion 6 and the cordless handset 2.

The measurement of the field intensity values using an increased threshold value requires an additional time but makes it possible to grasp the latest condition of wave reception. Where the field intensity values which have been already measured using the old threshold value and which are stored in a memory are compared with the new (increased) threshold value, on the other hand, it is not possible to grasp the latest condition of wave reception, but the required processing time is made shorter owing to elimination of the re-measurement of the field intensity values.

What is claimed is:

1. A wireless device comprising:
a first radio communication portion configured to effect radio communication with a first external communication device while using frequency bands selected one after another from a group of frequency bands;
a second radio communication portion configured to effect radio communication with a second external communication device, the second radio communication portion comprising
a field intensity measuring portion configured to measure a field intensity value for each of a plurality of frequency bands belonging to at least said group of frequency bands; and
an excluding portion configured to exclude each of said plurality of frequency bands for which the measured field intensity value is higher than a predetermined threshold value, from said group of frequency bands,
wherein the first radio communication portion is configured to use frequency bands of the group of frequency bands from which said plurality of frequency bands with field intensity values higher than the predetermined threshold value have been excluded by the excluding portion of the second radio communication portion.

2. The wireless device according to claim 1, further comprising a threshold increasing portion configured to increase said predetermined threshold value when the number of the frequency bands available for radio communication with the first external communication device is smaller than a predetermined lower limit as a result of exclusion of at least one frequency band by the excluding portion from said group of frequency bands.

3. The wireless device according to claim 1, wherein said first external communication device is a cordless handset of a digital cordless telephone set, and said first radio communication portion is a base unit of the digital cordless telephone set.

4. The wireless device according to claim 1, wherein said first external communication device is a child unit of a digital cordless telephone set while said first radio communication portion is a parent unit of the digital cordless telephone set, and said second external communication device is a member of a wireless local area network while said second radio communication portion is a wireless local area network transmitter/receiver portion.

5. The wireless device according to claim 1, wherein said first radio communication portion includes a hopping control portion configured to change the frequency bands of said group of frequency bands according to a hopping table, and a hopping table supplying portion configured to supply the second radio communication portion with the hopping table, said second radio communication portion being configured to measure the field intensity values for the frequency bands included in the hopping table supplied from the hoping table supplying portion, but not to measure the field intensity values for the frequency bands not included in the hopping table.

6. The wireless device according to claim 1, wherein transmission slots for transmitting data from the first radio communication portion do not include vacant slots that should be utilized for measuring the field intensity values.

7. The wireless device according to claim 1, wherein transmission slots for transmitting data from the first radio communication portion do not include vacant slots not used for data transmission.

* * * * *